United States Patent [19]

Kleinberg

[11] Patent Number: 5,089,909
[45] Date of Patent: * Feb. 18, 1992

[54] DOCUMENTATION ILLUMINATION MODULE FOR A MICROSCOPE SYSTEM

[75] Inventor: Larry K. Kleinberg, Toluca Lake, Calif.

[73] Assignee: Storz Instrument Company, St. Louis, Mo.

[*] Notice: The portion of the term of this patent subsequent to Apr. 16, 2008 has been disclaimed.

[21] Appl. No.: 589,082

[22] Filed: Sep. 27, 1990

Related U.S. Application Data

[60] Continuation of Ser. No. 312,904, Feb. 21, 1989, Pat. No. 5,007,723, which is a division of Ser. No. 50,948, May 15, 1987, Pat. No. 4,856,873.

[51] Int. Cl.$^5$ ...................... G02B 21/06; G02B 21/36
[52] U.S. Cl. .................................. 359/363; 359/381; 359/387
[58] Field of Search ............... 350/508, 514, 516, 511, 350/523, 524, 525, 502

[56] References Cited

U.S. PATENT DOCUMENTS 4,302,087 11/1981 Reinheimer et al. .
4,518,230 5/1985 Weber ........................... 350/511

Primary Examiner—Bruce Y. Arnold
Assistant Examiner—Martin Lerner
Attorney, Agent, or Firm—Brooks & Kushman

[57] ABSTRACT

A documentation illumination module by which full illumination of a properly oriented image of a microscope's field-of-view is returned to a documenting camera or the like. The module includes a cavity with a forming and field-of-view controlling lens system, channel for returning the image, focusing and magnifying lenses in the image channel, and an iris across the image channel. Fiber optics light is transmitted through the cavity and its lens system to a microscope and its field-of-view, then returned to module and to binoculars for an observer (surgeon), without need of beam splitting optical elements. Full light is available to camera and observer. The focusing and magnifying lenses are mounted in an alternatively positionable lens system, while a zoom lens assembly can be substituted therefor.

49 Claims, 6 Drawing Sheets

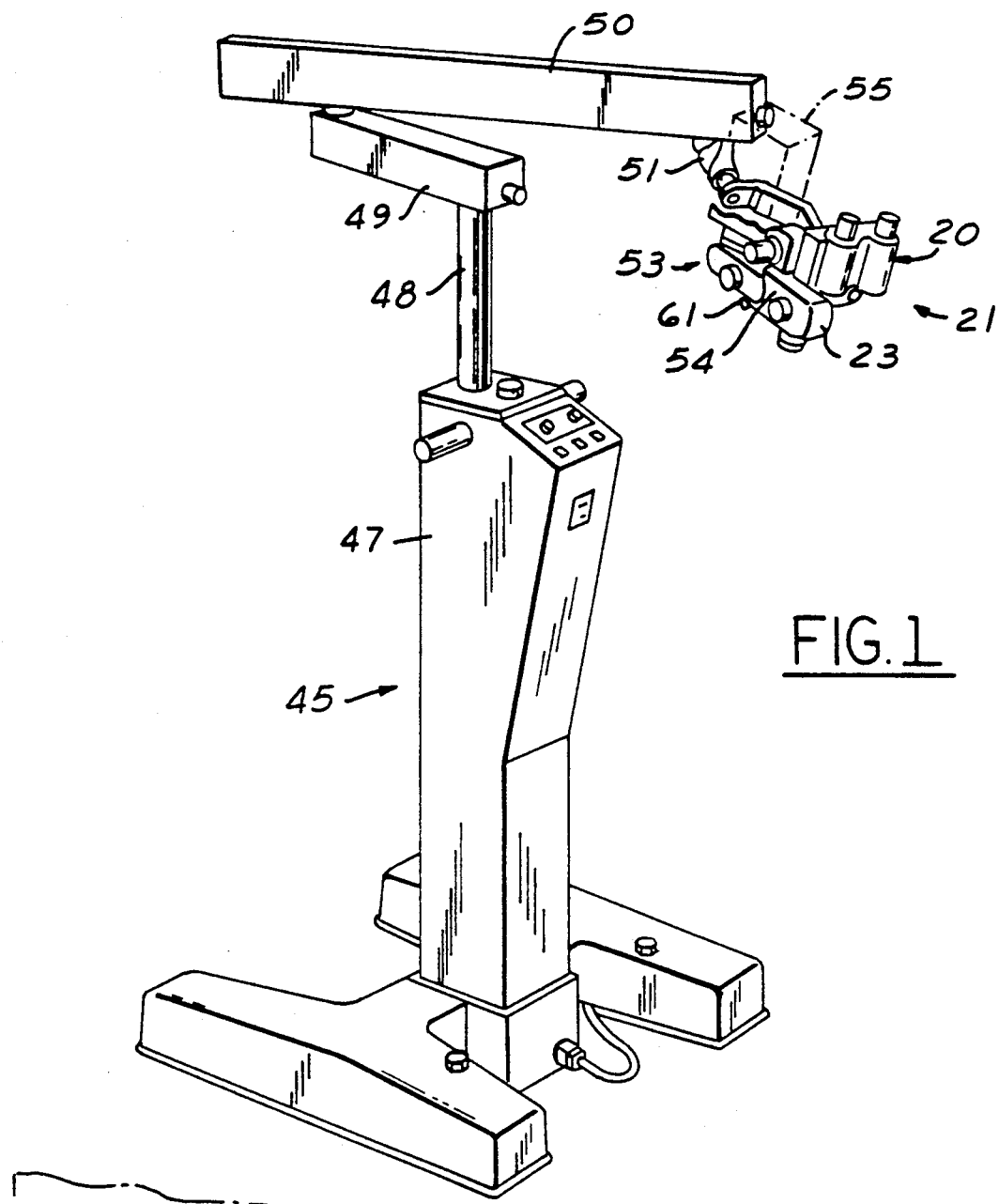
FIG.1
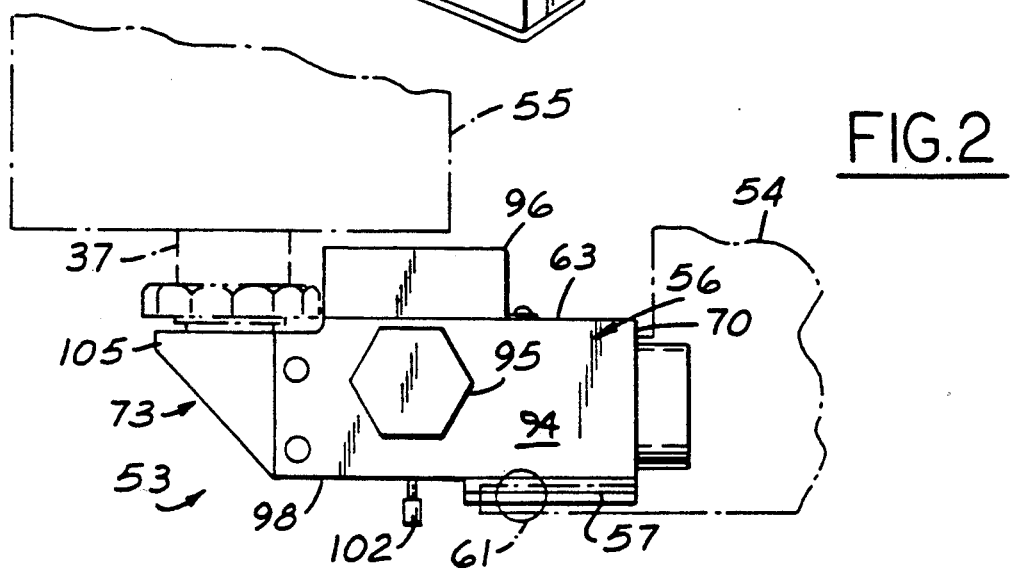
FIG.2

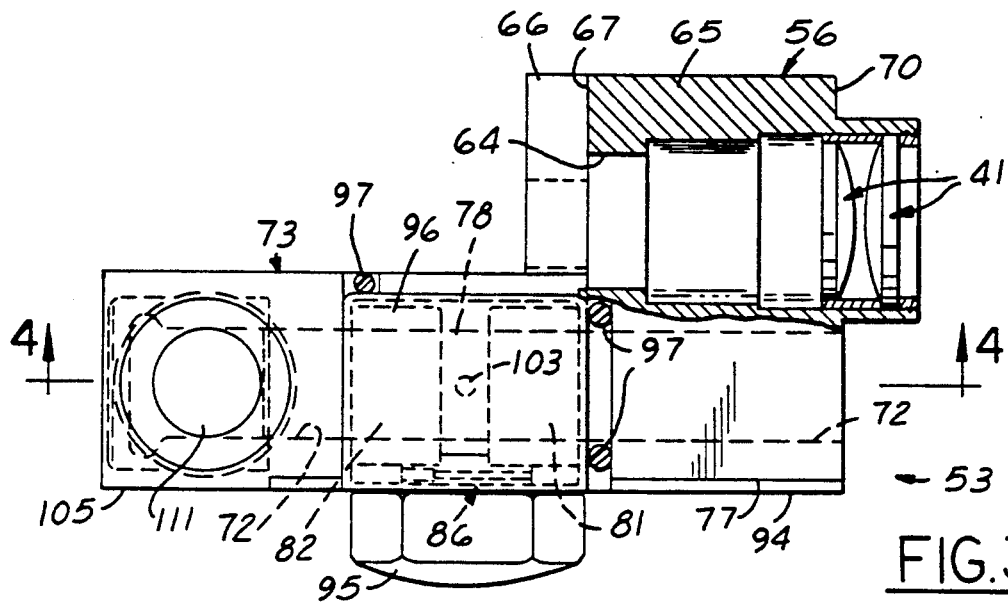
FIG.3
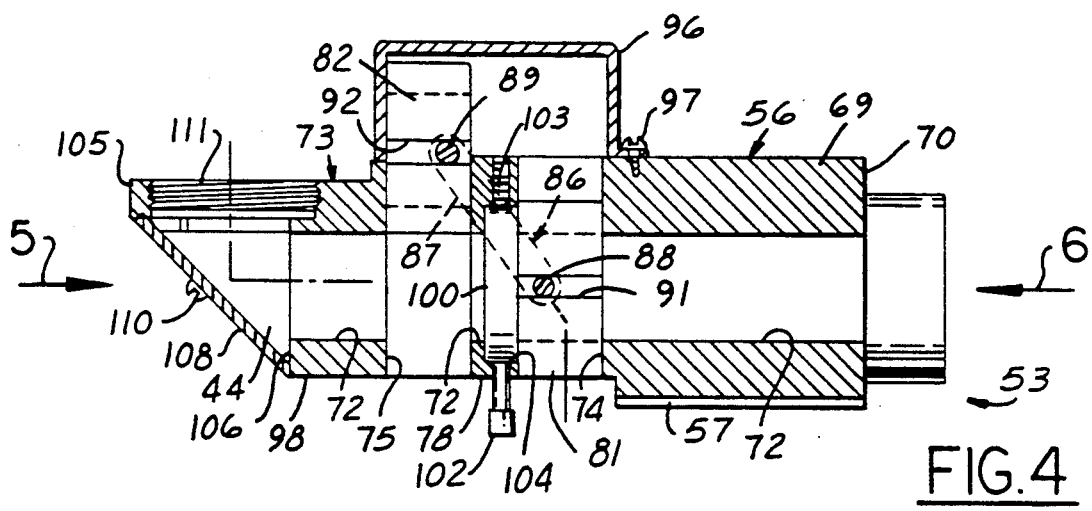
FIG.4
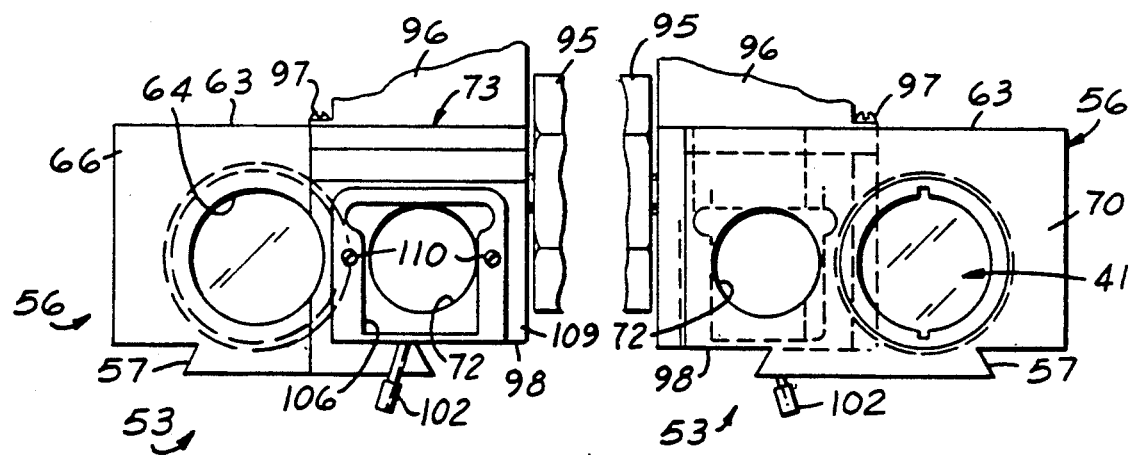
FIG.5  FIG.6

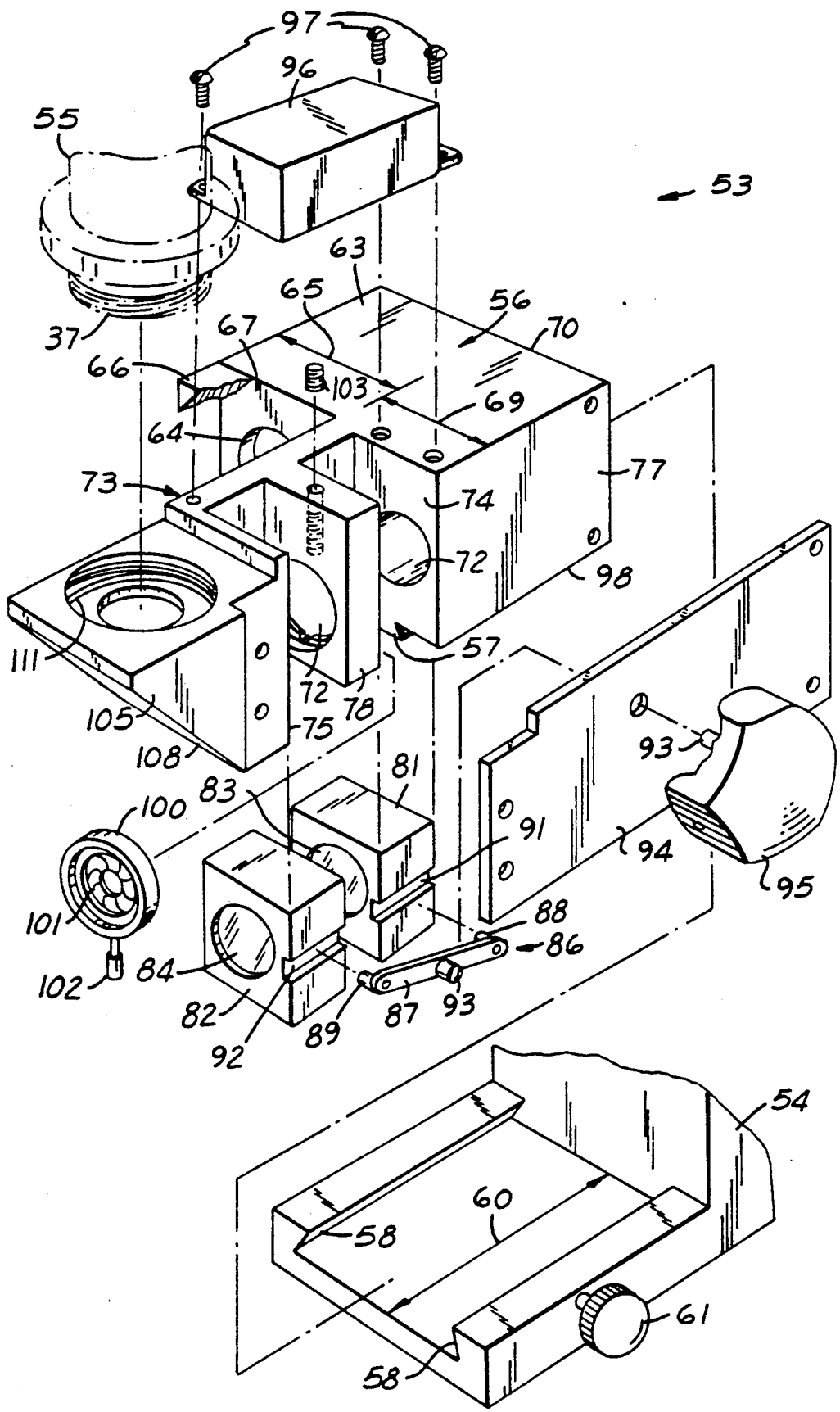
FIG.7

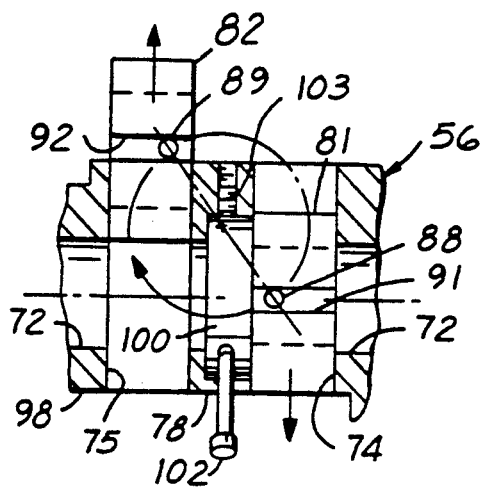
FIG.8
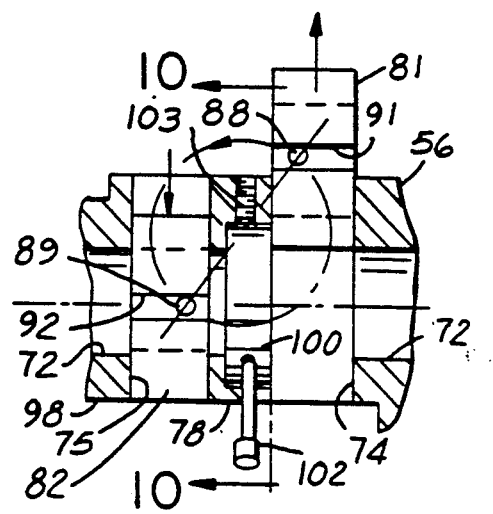
FIG.9
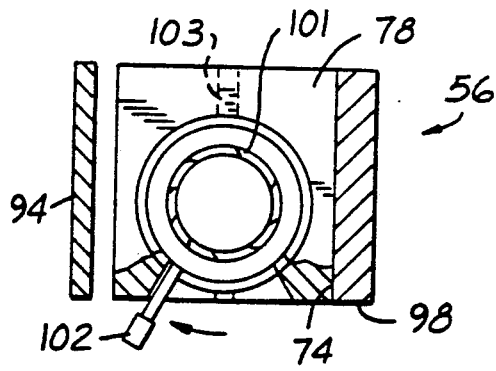
FIG.10
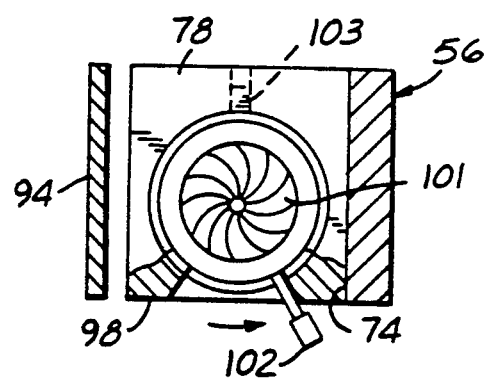
FIG.11

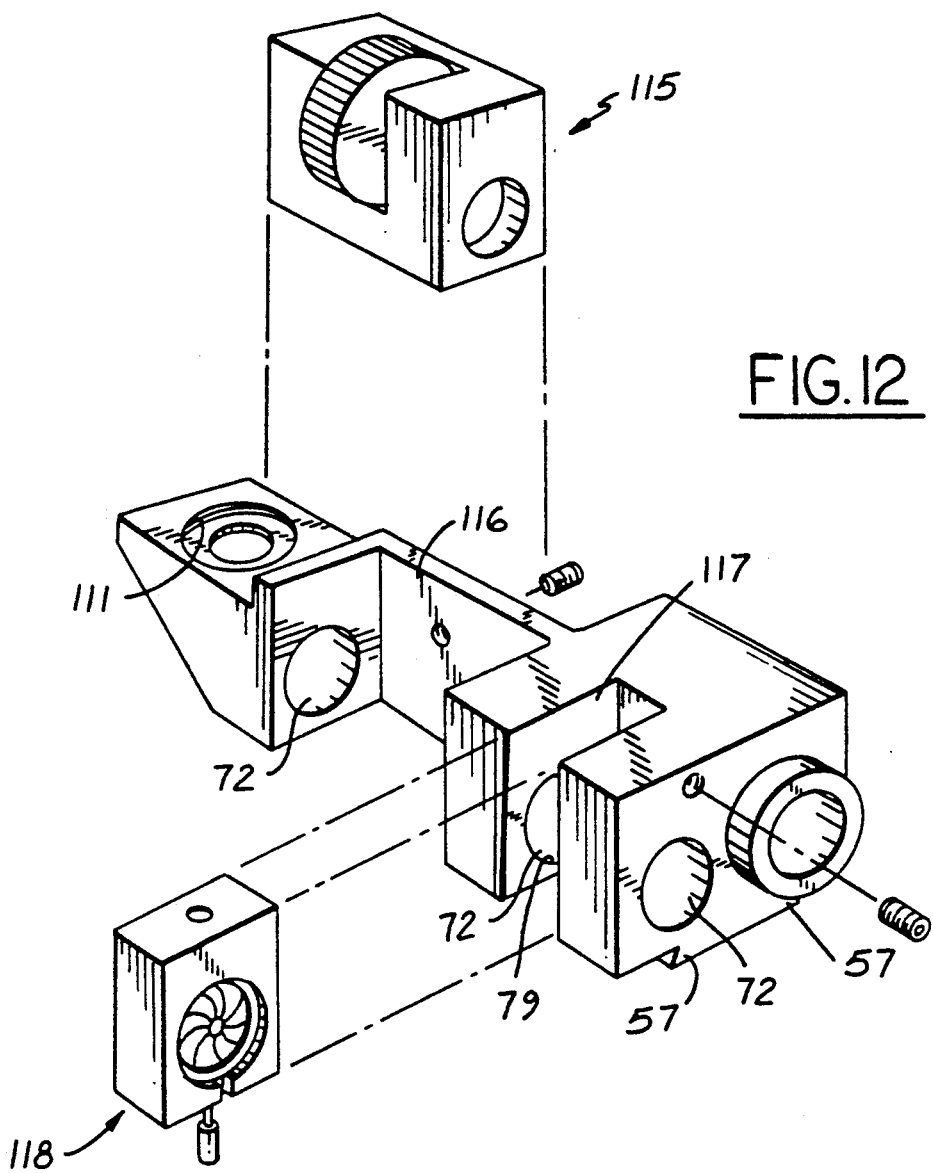
FIG.12
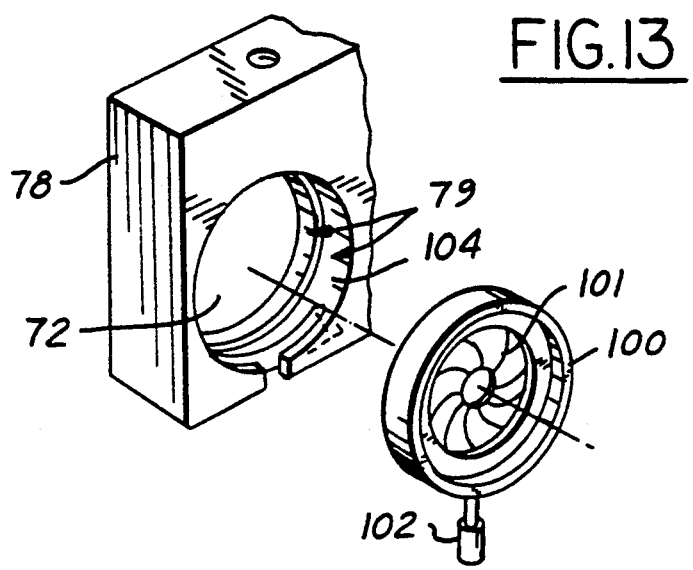
FIG.13

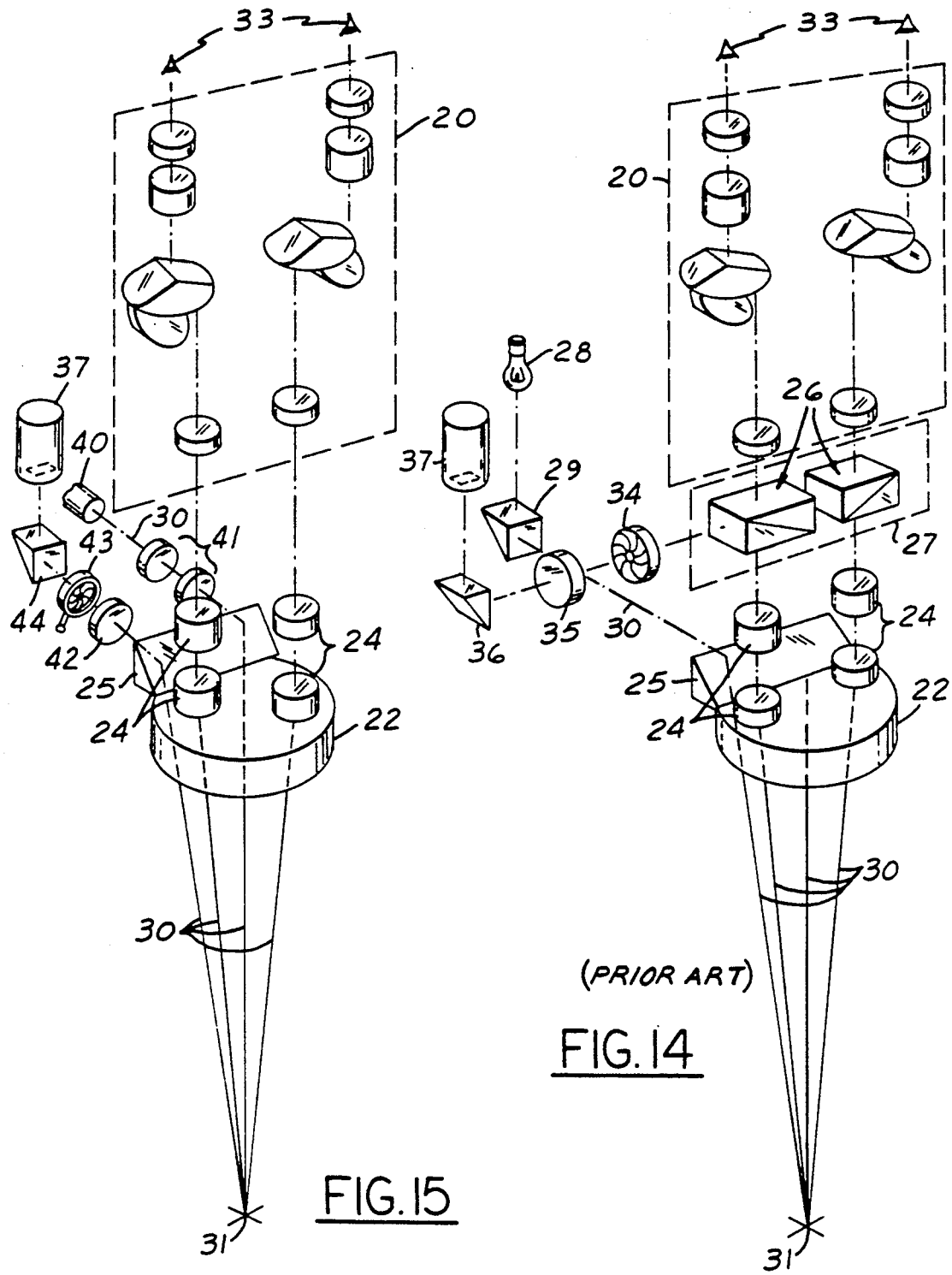
FIG. 15
(PRIOR ART)
FIG. 14

DOCUMENTATION ILLUMINATION MODULE FOR A MICROSCOPE SYSTEM

This is a continuation of co-pending application Ser. No. 312,904 filed on Feb. 21, 1989, now U.S. Pat. No. 5,007,723 issued on Apr. 16, 1991 which is a division of U.S. patent application Ser. No. 050,948 filed May 15, 1987 entitled "Documentation Illumination Module," now U.S. Pat. No. 4,856,873 issued on Aug. 15, 1989.

TECHNICAL FIELD

This invention is directed to documentation of a surgical operation, and in particular, to an attachment which is integrated into a binocular-microscope assembly used in such an operation, and whereby full illumination for documenting the operation in the documentation device is achieved in addition to full illumination through the binoculars.

BACKGROUND ART

Various kinds of attachment devices to microscopes and to documentation cameras are disclosed in the following U.S. Pat. Nos.: 2,209,532; 2,651,969; 3,820,882; 4,302,087; and 4,344,667.

DISCLOSURE OF THE INVENTION

The subject matter of the invention is an attachment module comprising a housing which includes an image channel communicating the image from a microscope-binocular system to a documentation device such as a camera, an illumination cavity and lens system therein through which an optics fiber cable transmits light to and controls the light circle at a surgeon's field-of-view via the microscope, an assembly of reciprocable magnification lenses mounted in the image channel to transmit a desired magnification of the transmitted image of the field-of-view, and a prism at one end of the channel for rectifying such image to the camera, and an adjustable iris or diaphragm mounted across the channel to control the intensity of light being transmitted to the camera via the image channel.

The attachment comprises a housing having a channel for transmitting an image of the field of view (of a surgical operation, for example), and a cavity for attaching an illumination source for the field-of-view, such as a fiber optics light transmitting cable. A lens system in the cavity forms the transmitted light and controls the size of the light circle at the (surgeon's) field-of-view. One or more magnification lens cage assemblies are disposed in alignment with the axis of an image channel for transmitting the image to a camera, and a prism at the end of such image channel is included for correcting an otherwise mirror image, so that a correctly-oriented image is documented in the camera at its film plane. An iris mounted in its ring is included in axial alignment with the image channel to control the intensity of the image to the camera. One module embodiment includes a pair of magnification lenses mounted in reciprocating cages disposed in corresponding compartments positioned across the image channel and operated alternatively for alignment with the axis of such image channel. A zoom lens system is an alternative to the pair of magnification lenses. The module itself is attached to a system assembly comprising a surgeon's binoculars and microscope, in such a manner that it does not constitute a subsystem disposed between the optical and other elements of the microscope and the binoculars. In state-of-the-art devices, beam splitting prisms are interposed in a position between the elements of the microscope and the binoculars, to provide illumination to the documentation device, and out of which non-full illumination levels result.

Various advantages are obtained in this invention. For example, there is no loss of available or full light to the surgeon viewing the surgical field-of-view (point of surgery in patient) through the binoculars. Both surgeon and documentation equipment receive full or one-hundred percent of the available light from the fiber optics source through this module. There is no need to incorporate into a microscope-binocular assembly an optical and light transmitting system separte and apart from the optical elements that constitute microscope and binoculars. In state-of-the-art devices, a dedicated structural ingredient to receive light is installed in such an assembly while it is fabricated at the factory and thus cannot be changed except by returning it to the factory for change or modification. By changing from one module with various magnification factors to another by this invention, or by changing the magnification and/or focusing lenses in the module itself, assuming the same light source, the size of the field-of-view can be varied. Different effects in terms of filtering out undesired wavelengths of light can be achieved. Loss of compactness of the microscope-binocular assembly is eliminated. This is important to the surgeon because the distance between his eye and the-field-of-view, even though in inches or millimeters, now can be kept to a minimum, whereas the complexity of state-of-the-art assemblies as it has developed in the art continually moved his eye position further away from the surgical field-of-view.

Further, the surgeon can see at a desired magnification the field-of-view, as well as independently controlling the magnification to the documentation equipment, such as a TV or other screen, or camera. When documentation equipment is not needed, the module is readily removed, and standard elements, such as for example, a counter-weight for balancing the assembly can be reattached without the necessity of conversion tools to do so.

Another advantage is the controllability of the size of the light circle appearing at the surgical field (field-of-view) by being able to change the combination of the forming lenses in the module cavity as desired, without the necessity of returning to the factory a microscope-binocular assembly in which such forming lenses are fixed and for them to be changed.

An object of this invention is to provide a module by which a surgeon and documentation equipment gains the full illumination available to the field of view.

Another object of the invention is to eliminate the necessity of beam splitting light which reduces illumination of the field-of-view, while transmission of full light to both surgeon and the documentation device is achieved.

Another object of the invention is to provide all available light to the surgeon and documentation equipment without any loss thereof by reason of a beam splitting optical system.

A still further object of the invention is to provide independent control of the magnification to the documentation equipment, while providing desired magnification through the binoculars to the surgeon.

A still further object of the invention is to provide an attachment module which is readily removable, and which is inter-changeable with a standard type of element, such as a counter-balancing weight means, to the entire surgeon's apparatus (microscope and binoculars) to which it is mounted, without the necessity of conversion tools.

Another object of the invention is to minimize or standardize the distance between surgeon's eyes and field-of-view, such distance though small is important to the surgeon during operation.

A further object of the invention is to move documentation device further away from the center of gravity of the apparatus the so that additional compensating weight or tension is not required to be structurally added to the surgeon's apparatus.

Another object of this invention is to control the size of the field-of-view independently of a microscope-binoculars assembly.

These and other objects and advantages of the invention will become more fully apparent by a complete and full reading of the following description, the appended claims thereto, and the accompanying drawing comprising six (6) sheets of fifteen (15) figures.

BRIEF DESCRIPTION OF THE DRAWINGS

FIG. 1 is a perspective view of a state-of-the-art surgeon's stand to which the subject matter of the instant invention is mounted.

FIG. 2 is a side elevational view of the module constituting an embodiment of the invention, as attached to a microscope and to a camera.

FIG. 3 is a top view, partially in cross-section, of the module of FIG. 2.

FIG. 4 is a sectional view taken on line 4—4 of FIG. 3.

FIG. 5 is an end view of the module taken on line 5 of FIG. 4.

FIG. 6 is an opposing end view of the module to that in FIG. 5, taken on line 6 of FIG. 4.

FIG. 7 is an exploded perspective view of the module shown in the previous figures.

FIGS. 8 and 9 are fragmentary elevational views, partially in cross-section, of a reciprocable magnifying lens system and of an iris utilized in the subject matter of the invention.

FIG. 10 is a view taken on line 10—10 of FIG. 9, with iris open.

FIG. 11 is a view like FIG. 10 but with iris closed.

FIG. 12 is an exploded perspective view of another embodiment of the invention.

FIG. 13 is an exploded perspective fragmentary view of a manner of mounting an iris in the module.

FIG. 14 is a schematic diagram of an illustration of an optical and light-transmitting-train of elements utilized in state-of-the-art devices.

FIG. 15 is a schematic diagram of the optical and light-transmitting-train of elements in the instant invention.

BEST MODE FOR CARRYING OUT THE INVENTION

Referring now to the drawings wherein reference characters correspond to like numerals hereinafter, the reader's attention is first directed to FIGS. 14 and 15 which provide a comparison between the optical trains-of-light and elements required or utilized in prior art devices (FIG. 14) and the optical trains-of-light and elements that are utilized in the present invention (FIG. 15) in the module.

FIG. 14 illustrates, first, optical elements in the nature of lenses and prisms that are utilized in a binocular structural formation identified by the endless phantom line 20. The structural formation 20 is included in assembly 21, FIG. 1, within such assembly, that also contains an objective lens 22 for the microscope within the housing, magnification lenses 24, and a right-angle-prism 25 mounted on objective lens 22. A beam splitting system of prisms 26, identified by the endless phantom line 27, is structurally incorporated within the housing of the surgeon's microscope-binoculars assembly 21. It will be seen that as light from a source 28 passes through a right-angle prism 29, the prism being fixedly incorporated in and as a component to such assembly, the light's rays 30 are directed to and through objective lens 22 to the surgeon's field-of-view at 31. The rays 30 then are reflected back through objective lens 22, and through magnification lenses 24, to reach the beam splitting system 26. At that point, it will seen that some of the light continues to the binocular system 20, and thus to the eyes 33 of the surgeon. Some of the light is split and transmitted through an iris 34, a lens system 35, a right angle prism 36, and thus to and through a coupling or apertured neck 37 on a documentation equipment, such as a camera. It becomes apparent that partial illumination is achieved at both the surgeon's eyes 33 and at the documentation device.

Turning now to FIG. 15, it illustrates the optical trains-of-light and elements for transmitting light in the operation of the instant invention. It will be seen that the binocular's scheme 20 and the objective lens system comprising elements 22, 24 and 25 are identical. However, beam splitting system 26 no longer is incorporated within the microscope-binocular assembly. Instead, a fiber optics cable 40 provides transmission of light to a lens system 41, conventionaly and known, which forms the light for and the size of the circle of light at a desired field of coverage, such light then being transmitted through the right angle prism 25 in the microscope, to and through objective lens 22, to the field-of-view 31. The light then returns by reflection objective lens 22. The full illumination of such reflected light continues to advance to and through the binocular system 20 to the surgeon's eyes 33, while at the same time, full illumination is reflected through right angle prism 25 and into another lens system 42, and iris 43, and a rectifying right angle prism 44, from which it is transmitted into a documentation equipment via apertured neck 37. Full illumination to the documenation equipment is achieved. The optical elements 41, 42, 43, and 44 are elements contained within the module of this invention.

FIG. 1 illustrates a state-of-the-art surgeon's stand 45, utilized in surgery procedures and practices, and to which the instant invention and a microscope-binoculars assembly 21 is mounted. Mounted atop its main operational and control column 47, a support post 48 is vertically oriented to support a pair of rotatable arm mounts 49 and 50. Arm mounts 49, 50, are rotatably adjustable, generally in a horizontal plane, in conventional and known manner, in order to position the assembly 21 into a desired position or location above a person on which surgery is to be performed by a surgeon who is to view the field-of-view of surgical operation through his binoculars 20 of the assembly 21. Assembly 21 is suitably detachably mounted to arm mount 50, as at 51.

The module 53 of this invention is mounted to the microscope's housing 54, FIGS. 1, 2, 7, at its one end, such housing including openings suitable for passage to and therefrom of light-via module 53, while its other end is suitably mounted to the apertured neck 37 of a documentation device 55, such as a camera, TV or other screen, or the like. Included in a housing, 56 FIG. 2, for module 53, FIGS. 5, 6, 7, there is a male dovetail mounting member 57 formed along its bottom, and which is received by a female dovetail mounting member 58 formed on the rear end of the microscope's housing 54. Female member 58 is sufficiently long, as at 60, FIG. 7, in order that male member 57 seats securely thereto, the members 57, 58 being clamped together by threaded clamping knob 61 passing through one of the elements of member 58 to grip the male member 57.

Housing 56 for module 53 comprises, FIG. 7, a body formation 63 in which a cavity 64 is formed in one portion 65 thereof and into which light from a fiber optics source, such as 40, FIG. 15, is introduced in the operation of the invention. Preferably, an aluminum adapter 66 having a suitable aperture is secured to a front wall 67 of portion 65 of body formation 63 containing cavity 64, one which will accept any one of various and known types of fiber optics cable connections through which light in the cable itself is transmitted into cavity 64.

Body formation 63 includes another portion 69 also extending forwardly from its rear wall 70 and in which portion 69 an image channel 72 is formed to continue forwardly in an extension member 73 mounted to portion 69. Extension member 73 includes a pair of spaced compartments 74, 75 which open to a side wall 77 in extension member 73 and are separated by a wall 78 that contains an aperture 79, FIG. 13, through which image channel 72 continues. Each pair of lens cages 81, 82, constituting lens system 42, FIG. 15, are disposed in its corresponding compartment or slot 74, 75 for sliding or reciprocable motion in its respective slot, and by which motion focusing and magnifying lens 83, 84 in their respective cages 81, 82 are alternatively positioned in alignment with aperture 79. This sliding or reciprocable motion is obtained by a means or mechanism 86 for alternatively disposing one or the other of such lenses 83, 84 and their corresponding cages 81, 82 in such alignment. Mechanism 86 comprises a rotatable link 87, FIG. 7, having lugs 88, 89 mounted at its opposing ends for seating in their corresponding lens cage slots 91, 92 which are horizontally oriented across the depth of their respective lens cages 81, 82. A shaft 93 is securely mounted centrally of link 87 and extends through a retaining plate 94 securely mounted to and along side wall 77 of housing 56. A finger knob 95 is suitably secured to shaft 93 on the outside of retaining plate 94. As knob 95 is rotated, shaft 93 rotates link 87. The rotation of link 87 is limited by the engagement of lugs 88, 89 in their corresponding slots 91, 92 of lens cages 81, 82. However, such rotation is designed to cause either cage 81 or cage 82, to be slid partially outwardly or above housing 56, FIG. 4, while the other or alternate cage with its lens remains in alignment in its corresponding slot with aperture 79 and thus channel 72. A protector or dust cap 96 is suitably secured by screws 97 to the top of extension member 73 of and over cage slots 74, 75 to protect the lens cages and lenses when it is elevated out of alignment with aperture 79. It may be noted from FIGS. 8 and 9 that neither cage 81, 82 slides below the bottom wall 98 of housing 53.

An iris ring 100 containing an adjustable iris 101, which is iris 43 in FIG. 15, is mounted in aperture 79, FIGS. 10, 11, 13. The opening and closing of iris 101 is controlled by a lever 102 extending down below bottom wall 98. Iris 101 performs the function of a diaphragm, controlling the intensity of light being transmitted through image channel 72 to camera 55. The iris 101 may be adjusted by the surgeon through rotation of its lever end 102. A set screw 103 secures iris ring 100 in its circular bore 104, FIG. 13, contained within wall 78.

Continuing forwardly of extension member 73, housing 56 for module 53 terminates in a pocket formation 105 containing a pocket 106, FIG. 4. The right angle prism 44 FIGS. 4, 15, seats in pocket 106 and is held therein by a metal cover plate 108 mounted at a terminal wall 109 of pocket formation 105 by suitable means such as a pair of screws 110, FIG. 5. Prism 44 corrects or rectifies the image from channel 72 for documentation purposes. Along the top of pocket formation 105, a threaded aperture 111 is formed therein for receiving a conventional documentation equipment or camera mount on apertured neck 37 by which camera 55 is suitably secured.

In operation of this invention, light is caused to travel through fiber optics cable 40 into and through adapter 66 and into the controllable lens system 41 mounted in cavity 64 and which forms the light to a desired circle of light coverage at the field-of-view 31. From cavity 64, the light is transmitted to right-angle prism 25, FIG. 15, thence through objective lens 22, and from there to the field-of-view 31 which the surgeon's eye 33 is observing through binoculars 20. Light from the field-of-view returns to the microscope, via objective lens 22, continuing in as full an illumination as is available from source 40 to binoculars 20, while full illumination also is transmitted back through right angle prism 25, to image channel 72 of module 53. No beam splitter is necessary. Such illumination of the image continues to travel through one or the other of the lenses 83, 84 in system 42 and which is in alignment with such channel 72 by reason of rotation of knob 95 to so align same by means of reciprocating its cage into alignment with aperture 79, and thus with channel 72. The full illumination of the image via rays 30 continues along channel 72 into prism 44. Without prism 44, or its equivalent such as a mirror, an undesired mirror image would be conveyed to the documenting camera 55. Prism 44 correctly orients the image to the film plane in camera 55 as rays 30 are reflected through aperture 111 into it or other documentation equipment.

The surgeon controls the amount or intensity of illumination to camera 55, by manipulating iris lever 102 that controls the opening of iris 101.

The surgeon readily changes from lens 83 to lens 84, or visa-versa, by manually rotating knob 95 in order that one or the other of their respective cages 81, 82 is positioned in its corresponding compartment 74, 75 so that the positioned lens is in alignment with image channel 72.

It now should be apparent that no beam-splitting prism or other beam-splitter is required between objective lens 22 of the microscope and the binocular system 20 for providing transmission of the image appearance to documentation device 55. By module 53, a full or desired degree of intensity of illumination is brought to bear upon the film plane of camera 55.

It should be understood that suitable openings in the housing of microscope 23 are provided for communication of cavity 64 and image channel 72 with the optical elements of the microscope depicted in FIG. 15, within the skill of the mechanic in the pertinent art to so fabricate in the microscope's housing In assembling module 53, prefabricated iris ring 100, its iris 101 and lever 102, are introduced into counterbored aperture 104, FIG. 13, formed in wall 78 which separates the two cage compartments 74, 75. Set screw 103 secures iris ring 100 in its proper position in such aperture 104 so that lever 102 is operable to open and close iris 101. Lens cages 81, 82 and their installed corresponding lens 83, 84 are inserted into their respective compartments 74, 75 with their corresponding horizontally disposed slots 74, 75 facing side wall 77 of body formation 63. Link 87 with its lugs 88, 89 are mounted to slots 91, 92, respectively, after which retaining plate 94 is secured in place by suitable screws (not shown). Shaft 93 extends through retaining plate 94, after which knob 95 is suitably secured thereto. Dust or protector cap 96 then is secured to the top of the extension member 73 by screws 97.

Prism 44 is inserted into its pocket 106 after which metal plate 108 is suitably secured by screws 110. The series or system 41 of lens are suitably installed in cavity 64 of portion 65 in body formation 63, and a desired adaptor 66 is securely mounted to front wall 67. When module 53 is ready for utilization in assembly or system 21, FIG. 1, dovetail members 57, 58 are mounted one to the other, with clamping knob 61 securing the two together, with rear wall 70 of body formation 63 flush against the contiguous cooperating wall of housing 54 of the microscope.

Each of the aforesaid described elements are suitably fabricated by known machining processing and techniques. Metal such as aluminum is suitable for housing 56. The prisms and lenses are generated in accordance with known optical manufacturing procedures and techniques. Iris ring 100, its iris 101 and lever 102 are manufactured in accordance with well known methods of fabrication. Aluminum is a suitable material for machining the lens cages 81, 82, retaining plate 94, cap 96 and knob 95.

Various changes and modifications may be made in module. For example, the pair of lens cages 81, 82, their lenses, and spacing wall 78 all may be removed for the purpose of substituting a conventional or standard zoom lens system 115, FIG. 12, within a large singular compartment 116 which replace receptor slots 74, 75. A separate slot 117 facing side wall 77 is formed in portion 69 of housing 56 to house iris means 118. Both means 115, 118 are mounted and suitably secured in their locations in known fashion and are positioned in alignment with image channel 72, to function in the same way in module 53 as the above first described embodiment of the invention. Fabrication of these changes follow in the same manner as described above regarding the first described embodiment. In this manner, zoom lens system can be utilized for other well known purposes, in surgical operational procedures.

It should be understood that the scope and spirit of the invention is not limited except to the extent of the following appended claims.

I claim:

1. An illumination module for a microscope system providing illumination from a light source to a field of view and to documentation equipment such as a camera for recording an image from the field of view by operation of said module, said module comprising:
   means for transmitting light from the light source to the field of view to produce a reflected image;
   said means receiving the reflected image and transmitting the reflected image without a beam splitter to the documentation equipment;
   said means including prism means to transmit the light to the field of view and the reflected image to the documentation equipment; and
   means for attaching said illumination module to said microscope system.

2. An illumination module as set forth in claim 1 further characterized by said means for transmitting light further includes a second lens system for forming the light transmitted to the field of view.

3. An illumination module as set forth in claim 1 including means for orienting the reflected image for recording in the documentation equipment.

4. An illumination module as set forth in claim 3 wherein said means for orienting the reflected image for recording in the documentation equipment comprises a second prism means.

5. An illumination module as set forth in claim 1 wherein said prism means comprises a right angle prism.

6. An illumination module as set forth in claim 1 wherein said means for receiving and transmitting the reflected image to the documentation equipment comprises means for altering the magnification of said reflected image.

7. An illumination module as set forth in claim 6 wherein said means for altering the magnification of said reflected image comprises a plurality of lenses disposed in a manually operable lens carriage means and wherein said lenses can be selectively interposed between said prism means and said documentation equipment.

8. The illumination module as set forth in claim 6 wherein said means for altering the magnification of said reflected image comprises a zoom lens.

9. An illumination module as set forth in claim 1 further comprising means for adjusting the amount of light communicated from said prism means to said documentation means.

10. An illumination module as set forth in claim 1 further comprising adjustable aperture means disposed between said prism means and said documentation means for adjusting the amount of light communicated to said documentation means.

11. The illumination module as set forth in claim 10 wherein said adjustable aperture means comprises an adjustable iris.

12. The illumination module as set forth in claim 1 wherein said means for attaching comprises dovetail mating means.

13. The illumination module as set forth in claim 1 wherein said means for attaching comprises interlocking threaded means.

14. The illumination module as set forth in claim 1 further comprising lens means mounted for sliding into and out of the optical path defined by the reflected image from said prism means to said documentation module.

15. The illumination module as set forth in claim 1 further comprising at least one lens means disposed in the illumination path defined by the transmitted light from the light source to the field of view, said lens means comprising means for altering the light directed to said field of view.

16. A module for attachment to a microscope assembly, said assembly having a light source, prism means and lens means and said module providing illumination from said light source to a field of view and to documentation equipment, such as a photographic camera, video camera, television camera, or the like, for recording or documenting an image from the field of view without a beam splitter, said module comprising:

a housing;

first means in the housing for transmitting light from the light source through said prism means and said lens means to the field of view to produce a reflected image;

second means in said housing for receiving said reflected image from said prism means and transmitting said reflected image to said documentation equipment; and means for attaching said housing to said microscope assembly.

17. The module as set forth in claim 16 wherein said first means contains second lens means for altering the light from the light source.

18. The module as set forth in claim 16 wherein said second means contains means for altering the magnification of said reflected image.

19. The module as set forth in claim 18 wherein said means for altering the magnification comprises a zoom lens.

20. The module as set forth in claim 18 wherein said means for altering the magnification comprises a plurality of lenses and means for selectively positioning said lenses in said housing to alter the magnification of said reflected image to said documentation equipment.

21. The module as set forth in claim 16 wherein said second means further comprises means for orienting the reflected image for recording in the documentation equipment.

22. The module as set forth in claim 21 wherein said means for orienting the reflected image comprises second prism means.

23. The module as set forth in claim 16 wherein said prism means comprises a right angle prism and said lens means comprises an objective lens.

24. The module as set forth in claim 16 further comprising means for attaching said light source to said housing.

25. The module as set forth in claim 16 wherein said second means includes adjustable aperture means for adjusting the amount of light communicated to said documentation means.

26. The module as set forth in claim 25 wherein said adjustable aperture means comprises an iris.

27. A module for a microscope system providing illumination from a light source to a field of view and without a beam splitter providing a reflected image from the field of view to a means for recording said image, said module comprising:

a housing for attachment to said microscope system;

means defining an illumination channel in said housing for providing illumination to a field of view;

means defining an image channel in said housing for receiving said reflected image and transmitting it to said means for recording said image; and means for attaching said housing to said microscope system.

28. The module as set forth in claim 27 wherein said illumination channel means is in operable communication with said light source when said housing is attached to said microscope system.

29. The module as set forth in claim 27 wherein said image channel means is in operable communication with said recording means.

30. The module as set forth in claim 27 wherein said illumination channel means comprises means for focusing and controlling the size of the illumination from said light source.

31. The module as set forth in claim 27 wherein said image channel means comprises means for orienting the reflected image for recording by said recording means.

32. The module as set forth in claim 27 wherein said image channel means comprises means for altering the magnification of the reflected image.

33. The module as set forth in claim 32 wherein said means for altering the magnification of said reflected image comprises a plurality of lenses disposed in a manually operable lens carriage means and wherein said lenses can be selectively interposed in said image channel means.

34. The module as set forth in claim 27 wherein said image channel means comprises means for adjusting the amount of light transmitted to said recording means.

35. An illumination module for a microscope system providing illumination from a light source to a field of view and to documentation equipment such as a camera for recording an image from the field of view by operation of said module, said module comprising:

means for transmitting light from the light source to the field of view to produce a reflected image;

said means receiving the reflected image and transmitting the reflected image without a beam splitter to the documentation equipment;

said means including prism means to transmit the light to the field of view and the reflected image to the documentation equipment;

said means for receiving and transmitting the reflected image to the documentation equipment comprising means for altering the magnification of said reflected image; and said means for altering the magnification of said reflected image comprising a plurality of lenses disposed in a manually operable lens carriage means and wherein said lenses can be selectively interposed between said prism means and said documentation equipment.

36. An illumination module for a microscope system providing illumination from a light source to a field of view and to documentation equipment such as a camera for recording an image from the field of view by operation of said module, said module comprising:

means for transmitting light from the light source to the field of view to produce a reflected image;

said means receiving the reflected image and transmitting the reflected image without a beam splitter to the documentation equipment;

said means including prism means to transmit the light to the field of view and the reflected image to the documentation equipment; and lens means mounted for sliding into and out of the optical path defined by the reflected image from said prism means to said documentation module.

37. A module for attachment to a microscope assembly, said assembly having a light source, prism means and lens means and said module providing illumination from said light source to a field of view and to documentation equipment, such as a photographic camera, video camera, television camera, or the like, for recording or documenting an image from the field of view without a beam splitter, said module comprising:

a housing;

first means in the housing for transmitting light from the light source through said prism means and said lens means to the field of view to produce a reflected image;

second means in said housing for receiving said reflected image from said prism means and transmitting said reflected image to said documentation equipment; and means for attaching said light source to said housing.

38. A module for a microscope system providing illumination from a light source to a field of view and without a beam splitter providing a reflected image from the field of view to a means for recording said image, said module comprising:

a housing for attachment to a microscope system;

means defining an illumination channel in said housing;

means defining an image channel in said housing;

said image channel means comprising means for altering the magnification of the reflected image, and said means for altering the magnification of said reflected image comprising a plurality of lenses disposed in a manually operable lens carriage means, said lenses capable of being selectively interposed in said image channel means.

39. A portable removable illumination module for transmitting light from a light source to a microscope assembly, the microscope assembly having a housing, viewing lens means for observing a field of view, prism and lens means in the housing for directing light to the field of view, an opening for passage of light into the housing and the prism and lens means, and a mounting mechanism thereon for the illumination module, said illumination module comprising:

a module housing;

mounting means on the module housing for mating with said mounting mechanism on the microscope assembly;

said module housing having a first port for receiving illumination from the light source;

said module housing having a second port for transmitting illumination to said microscope housing; and lens means in said module housing for optically communicating illumination from said first port to said second port;

whereby said module housing can be removed and installed on said microscope housing in order to form, control and transmit light from the light source into the microscope assembly, to the prism and lens means and to the field of view.

40. The module as set forth in claim 39 further comprising securing means for securely holding together in mating relationship said module housing mounting means and said microscope assembly mounting mechanism.

41. The module as set forth in claim 40 wherein said securing means comprises a threaded clamping knob.

42. The module as set forth in claim 39 wherein said module housing mounting means comprises first dovetail means and said microscope assembly mounting mechanism comprises a second dovetail means for mating with said first dovetail means.

43. The module as set forth in claim 39 wherein said lens means forms and controls the size of the light from the light source.

44. The module as set forth in claim 39 wherein said light source is a fiber optic light source and said first port on said module housing includes a fiber optics cable adapter means.

45. A removable illumination module for a microscope assembly, the microscope assembly having a microscope for observing a field of view, the microscope having a microscope housing means, lens system, and viewing ports, and a source of illumination associated with said microscope housing means for transmission of the primary source of viewing light to said field of view, said illumination module comprising:

module housing means, said module housing means having a first end, a second end and at least one side wall portion adjacent said ends;

mounting means on one of said side wall portions for removably attaching said module housing means to said microscope housing means;

an illumination port on said first end of said module housing means for receiving illumination from said source of illumination;

illumination channel means in said module housing means for optically communicating illumination from said source of illumination to said field of view.

46. The module as set forth in claim 45 wherein said mounting means on said side wall portion for attaching said module housing means to said microscope housing means comprises dovetail mating means.

47. A module for attachment to a microscope system, said system having a microscope means for observing a field of view, light source means, and lens means and said module providing illumination from said light source means to provide the primary source of viewing light to said field of view, said module comprising:

a housing having a first end, a second end, and at least one side wall member between said ends;

means in the housing for transmitting light from the light source means to said field of view to produce a reflected image;

dovetail means on said side wall member for attaching said housing to mating dovetail means on said microscope means; and means for separately attaching said light source means to said first end of said housing.

48. The module as set forth in claim 47 further comprising means in said housing for focusing and controlling the illumination from said light source means.

49. A removable illumination module for a microscope assembly, said microscope assembly having a microscope for observing a field of view, a microscope housing, a source of illumination for said field of view, and first dovetail means on said microscope housing, said module comprising:

a module housing with a first end, a second end and side wall means extending between said first end and said second end;

an illumination port on siad first end of said module housing for receiving illumination from said source of illumination;

second dovetail means on said side wall means of said module housing for mating with said first dovetail means and attaching said illumination module to said microscope assembly; and channel means in said module housing for optically communicating illumination entering said illumination port to said field of view.

* * * * *